United States Patent [19]
Shim

[11] Patent Number: 5,777,699
[45] Date of Patent: Jul. 7, 1998

[54] CATHODE RAY TUBE NECK FIXING STRUCTURE

[75] Inventor: Jae Su Shim, Suwon, Rep. of Korea

[73] Assignee: Samsung Electronics Co., Ltd., Suwon, Rep. of Korea

[21] Appl. No.: 451,467

[22] Filed: May 26, 1995

[30] Foreign Application Priority Data

May 30, 1994 [KR] Rep. of Korea ............... 1994-12085

[51] Int. Cl.⁶ .................................................. H04N 5/645
[52] U.S. Cl. .......................... 348/830; 348/829; 348/831
[58] Field of Search ................................. 348/828–831; 335/210; 361/682; 439/296; 313/412, 414

[56] References Cited

U.S. PATENT DOCUMENTS

| | | | |
|---|---|---|---|
| 2,840,740 | 6/1958 | Bickford | 348/830 |
| 3,863,312 | 2/1975 | Aldrich et al. | 348/829 |
| 3,921,110 | 11/1975 | Ishii et al. | 348/829 |
| 4,590,540 | 5/1986 | Nicholson et al. | 361/400 |
| 5,191,253 | 3/1993 | Kang | 348/830 |
| 5,204,648 | 4/1993 | Jei | 348/831 |
| 5,321,516 | 6/1994 | Chen | 348/825 |
| 5,408,277 | 4/1995 | Strijbos et al. | 348/831 |

Primary Examiner—Edward L. Coles, Sr.
Assistant Examiner—Stephen Brinich
Attorney, Agent, or Firm—Banner & Witcoff, Ltd.

[57] ABSTRACT

A neck attachment structure of a cathode ray tube comprising a retainer mounted on one side of a shield case assembly for inserting and fixing a circuit board; and a locking band rotatably coupled to the retainer for preventing the loosening of the neck enables the neck to be fixed to the circuit board by applying an incremental tightening force by rotating the locking band. The neck is fixed to the circuit board by soldering and then attached to the shield case assembly. The locking band ensures that the neck is firmly fixed on the circuit board and eliminates the occurrence of cracks at the soldered junction experienced in the prior art, thereby enhancing product reliability.

9 Claims, 8 Drawing Sheets

CATHODE RAY TUBE NECK FIXING STRUCTURE

BACKGROUND OF THE INVENTION

The present invention relates to a structure for affixing a cathode ray tube within a monitor case, and more particularly, to an attachment device for stably affixing the base of the neck of a cathode ray tube to a printed circuit board. An attachment means is cooperatively installed on a shield case assembly within which a circuit board is inserted and affixed. The attachment means prevents the neck of the cathode ray tube, and more particularly, the junction of the base of the neck and the circuit board from cracking and failing due to the weight of electronic components mounted on the circuit board.

Figure 1:
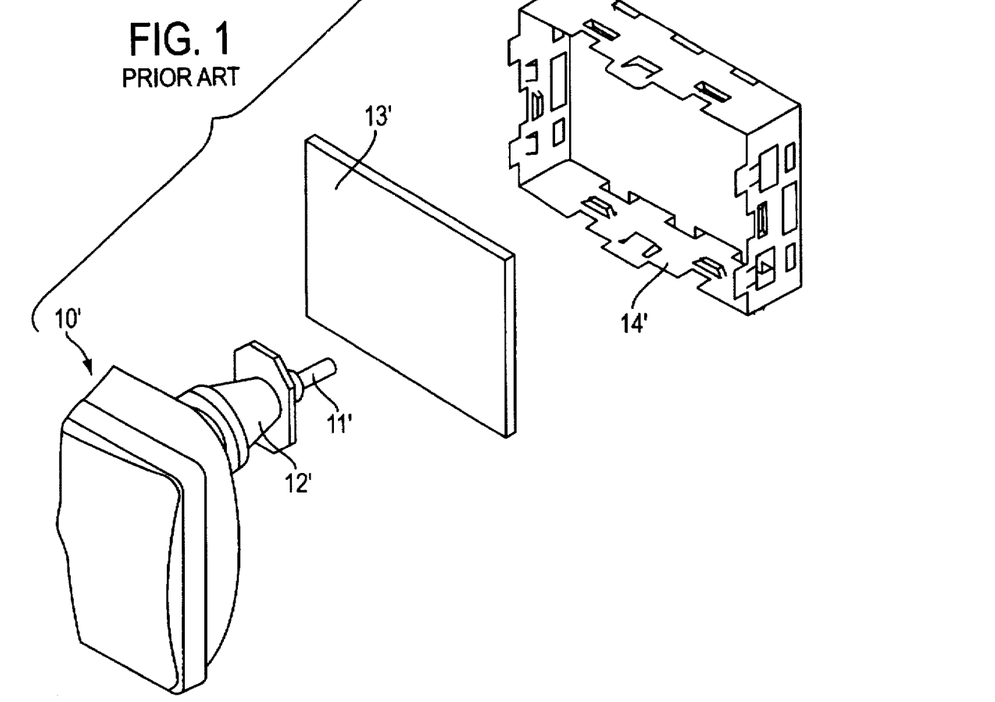
FIG. 1 is an exploded perspective view of a conventional neck fixing structure of a cathode ray tube.
Figure 2:
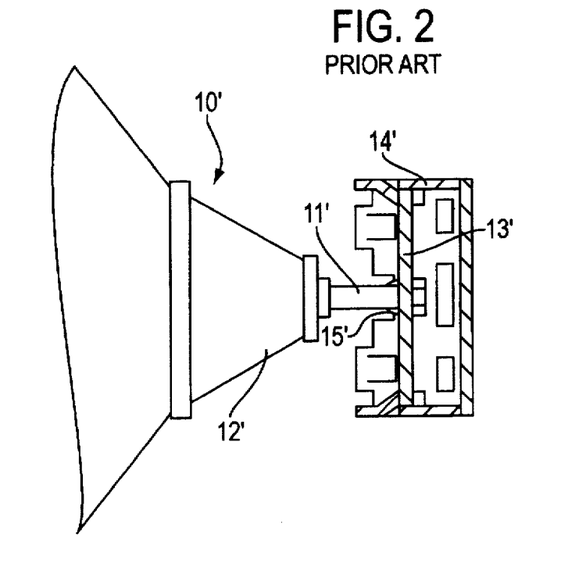
FIG. 2 is an assembled sectional view of the conventional neck fixing structure shown in FIG. 1.

FIGS. 1 and 2 show a conventional neck attachment of a general cathode ray tube to a circuit board, all of which is installed in a monitor case (not shown). Referring to FIGS. 1 and 2, in which primed reference numerals are used, the phosphorous surface of a cathode ray tube 10', generally having a panel, funnel and neck is illustrated as would be installed in the monitor case, with the phosphorous surface toward the front. A deflection yoke 12' for vertically and horizontally deflecting an electron beam projected from an electron gun is mounted on the funnel in front of a neck 11' of cathode ray tube 10'. A circuit board 13', onto which neck 11' of cathode ray tube 10' must be affixed, is inserted into and fastened to a shield case 14' for electromagnetic shielding. The base of neck 11' is attached to the circuit pattern of circuit board 13' by soldering. An adhesive 15' is coated around the base of the soldered neck at the junction with the circuit board and serves as a bonding member. In this state, current can be applied to circuit board 13 to form an image on the phosphorous surface.

In the conventional neck attachment constructed as above, since the neck of the cathode ray tube is adhesively attached to the circuit board by coating the periphery of the base of the neck with a bonding member in the same location that the neck base is grounded or attached to the circuit board by soldering, the attachment is inconvenient and prone to failure. Cracks occur at the soldered joint due to the weight of the other electronic components mounted on the circuit board causing the circuit board to malfunction. Further, when current is applied to the circuit board, the bonding member or adhesive tends to soften or melt due to the heat from the powered circuit board, so that the neck does not remain firmly affixed to the circuit board, thus weakening the connection and reducing product reliability.

SUMMARY OF THE INVENTION

Therefore, it is an object of the present invention to provide a neck attachment structure for stably affixing the neck of a cathode ray tube to a printed circuit board. To this end, an attachment assembly including a retainer and locking band are mounted on a shield case assembly. The shield case assembly contains a circuit board to which the base of the neck must be connected. The locking band rotatably cooperates with the retainer to prevent loosening of the neck and circuit board connection such that the neck can be fastened to the circuit board by applying an incremental tightening force. Thus, the neck is firmly affixed onto the circuit board in a stable manner thereby enhancing product reliability.

To accomplish the object of the present invention, a neck attachment structure of a cathode ray tube is provided in which the base of the neck of the cathode ray tube is connected to a circuit pattern formed on a circuit board by soldering, and in which an adhesive is coated at the junction of the circuit board and base of the neck. The attachment structure comprises a shield case assembly for housing the circuit board and shielding it from any electromagnetic waves generated from the circuit board when current is applied. An attachment means is mounted on the shield case assembly to securely retain the neck. The attachment means includes a retaining means and incremental tightening means having aligned apertures presenting a neck receiving portion. The incremental tightening means can be rotatably adjusted to control the size of the inner diameter of the neck receiving and fixing means so that the inner diameter is substantially equal to the outer diameter of the neck inserted therein. In this manner, the neck of the cathode ray tube is securely clamped or affixed to the shield case assembly and the circuit board.

These and other features and advantages of the invention may be more completely understood from the following detailed description of the preferred embodiment of the invention with reference to the accompanying drawings.

DETAILED DESCRIPTION OF THE PREFERRED EMBODIMENT

Figure 3:
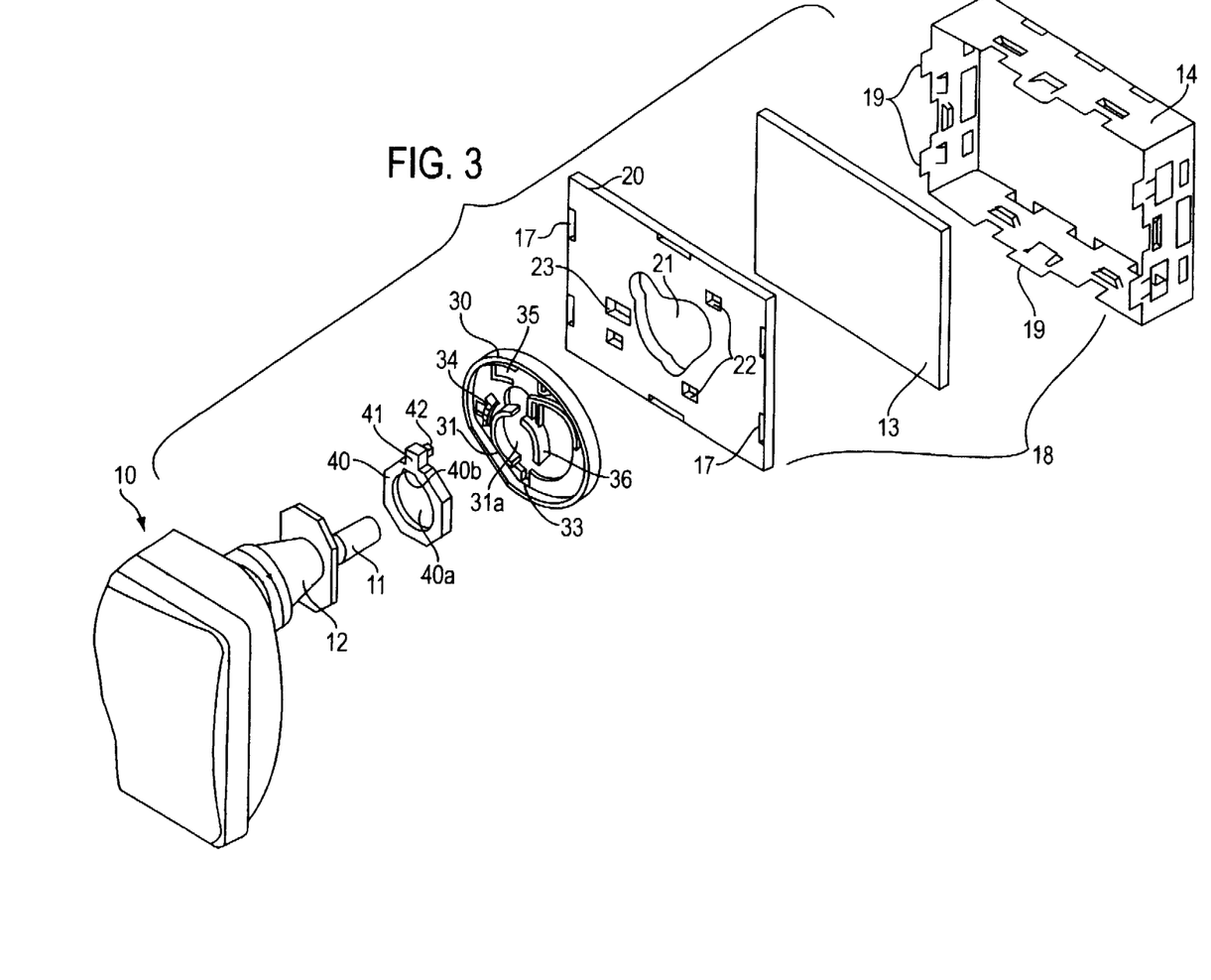
FIG. 3 is an exploded perspective view of a cathode ray tube neck attachment structure in accordance with the present invention.

Referring to FIG. 3, a cathode ray tube 10 to be housed in a monitor case (not shown) has a deflection yoke 12 for horizontally and vertically deflecting an electron beam. Yoke 12 is mounted forward of a neck 11 of cathode ray tube 10. A shield case assembly 18 comprises a casing 14 and cover 20 and contains a circuit board 13 which is inserted into casing 14 and fixed therein for shielding electromagnetic wave generated from circuit board 13. The present invention is directed to an attachment means for supporting neck 11 securely on shield assembly 18 to ensure a reliable connection between the electrical components in the base of the neck 11 to circuit board 13.

Shield case cover 20 of assembly 18 is provided with slots 17 arranged around its periphery to receive tabs 19 of casing 14. Cover 20 is formed with an insertion aperture 21 into which neck 11 of cathode ray tube 10 is inserted. A plurality of assembly slots 22 are provided around insertion aperture 21 at predetermined locations. Cover 20 also has locating aperture 23 which serves to prevent a reverse-rotation of the assembled device.

Figure 4A:
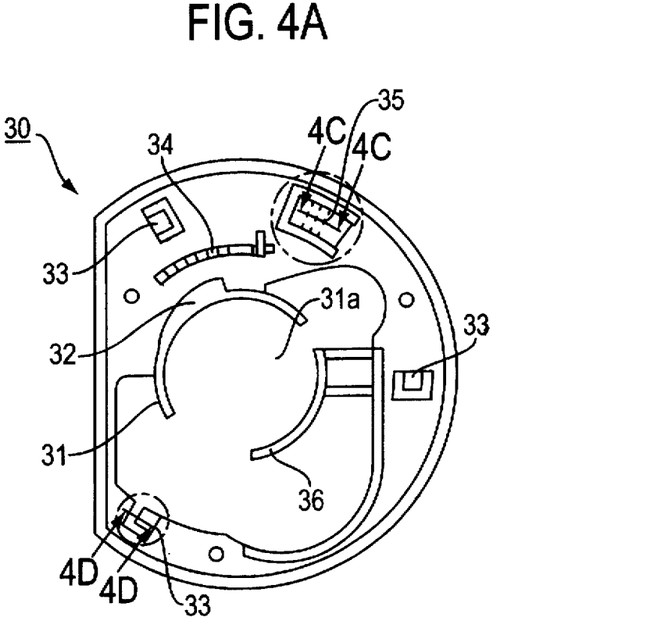
FIG. 4A is a plan view of a retainer component shown in FIG. 3.

One component of the attachment structure shown in detail in FIG. 4A is a disc-like retainer 30 for affixing and stably supporting neck 11 of cathode ray tube 10 in cooperation with shield case assembly 18. A set of arcuate ribs 31 and 36 defining a cavity or support aperture 31a are integrally formed at substantially the center of retainer 30. Arcuate ribs 31 and 36 present protruding cylindrical surfaces which define support aperture 31a. Ribs 31 and 36 have a predetermine resilience. A control cam portion 32 is integrally formed on arcuate rib 31.

Figure 4B:
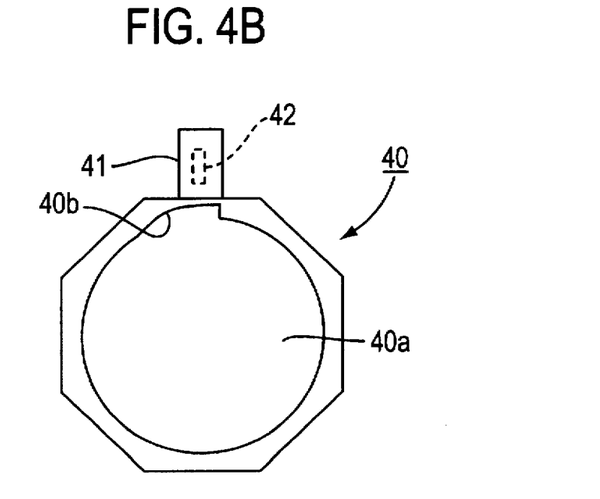
FIG. 4B is a plan view of a locking band shown in FIG. 3.
Figure 4C:
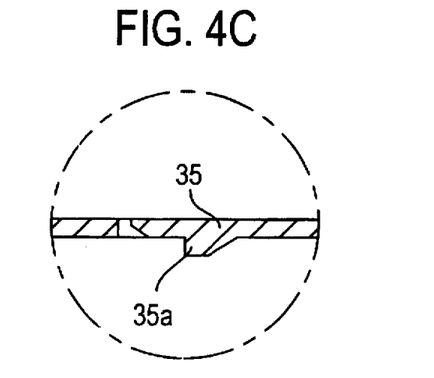
FIG. 4C is a cross section taken along line 4C—4C of FIG. 4A.
Figure 4D:
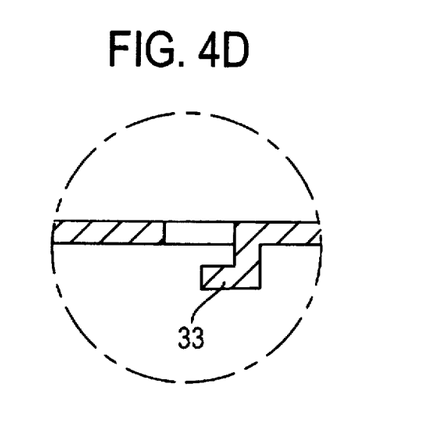
FIG. 4D is a cross section taken along line 4D—4D of FIG. 4A.

Retainer 30 also includes a plurality of assembly clips 33 disposed on its rearward side to be fitted into assembly slots 22 of shield case cover 20 so as to secure retainer 30 thereon as shown in detail in FIG. 4D. Another element of holder 30 is an arcuate ratchet portion 34, also shown in FIGS. 6, 7A and 7B, disposed above control cam 32. Locating element 35 having a halting tab 35a for engaging locating aperture 23 of shield case cover 20 and thereby preventing retainer 30 from rotating reversely is preferably formed adjacent ratchet 34. FIG. 4C shows the engagement of locating element 35 to locating aperture 23.

Figure 6:
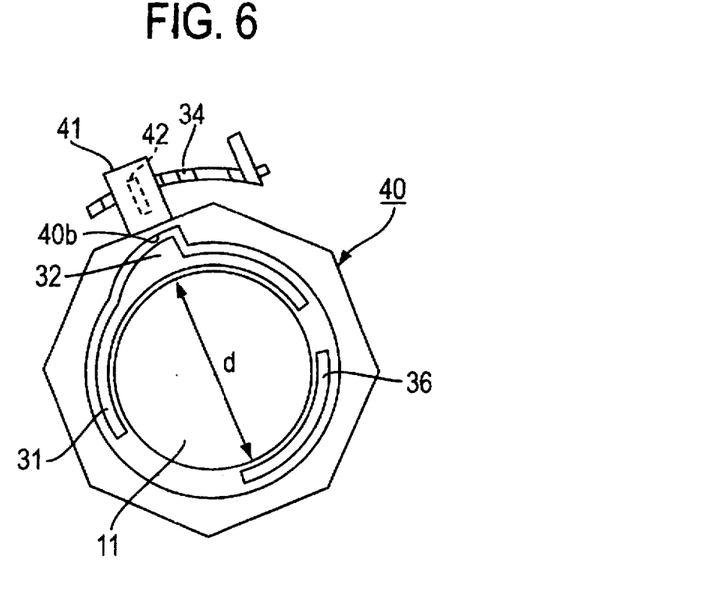
FIG. 6 is a front view of a locking band component assembled to a retainer component, with only portions of the retainer component shown.
Figure 7A:
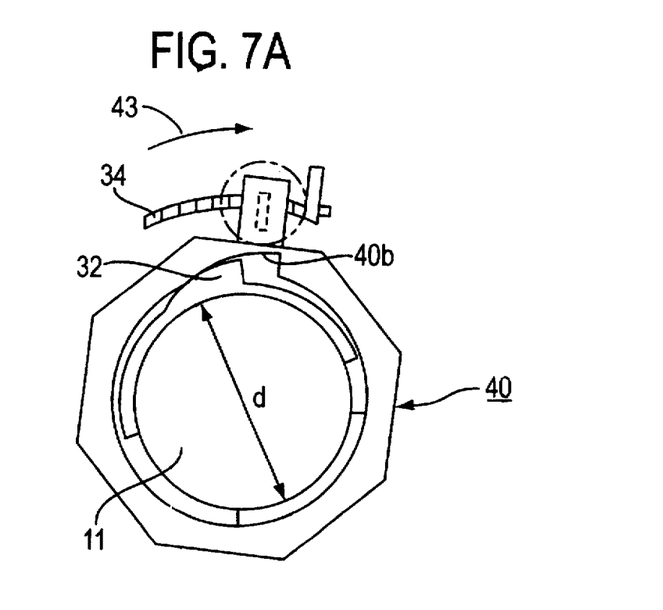
FIG. 7A is similar to FIG. 6 shown with the locking band rotated in a tightening direction.
Figure 7B:
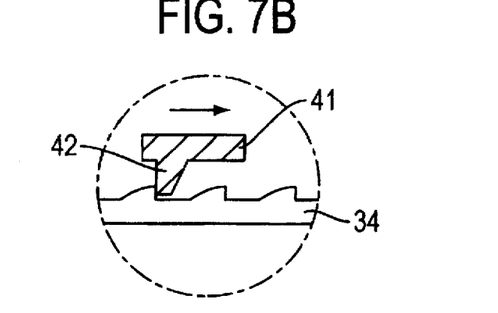
FIG. 7B is a cross section taken along line 7B—7B of FIG. 7A.

Another component of the attachment structure is a locking band 40 shown in detail in FIG. 4B which is generally ring shaped and cooperatively coupled to retainer 30 and operates as a tightening means for tightening the attachment structure around neck 11. Locking band 40 includes a locking aperture 40a to be aligned with support aperture 31a of retainer 30 and insertion aperture of shield case cover 20. Locking band 40 is fitted onto retainer 30 so that locking aperture 40a contains and surrounds arcuate ribs 31 and 36 as seen in FIGS. 6, 7A and 7B. A curved notch 40b for receiving control cam 32 is integrally formed on locking aperture 40a. In addition, an arm 41 having a pawl member 42 is mounted on one side of locking band 40. When locking band 40 is assembled to retainer 30, arm 41 is arranged so that pawl 41a engages ratchet 34.

The operation of the neck attachment structure of the present invention will be explained with reference to FIGS. 5A–8 which illustrate the assembly of retainer 30 to shield case cover 20, and the assembly of locking band 40 to retainer 30. In addition, the attachment and tightening are also illustrated.

Figure 5A:
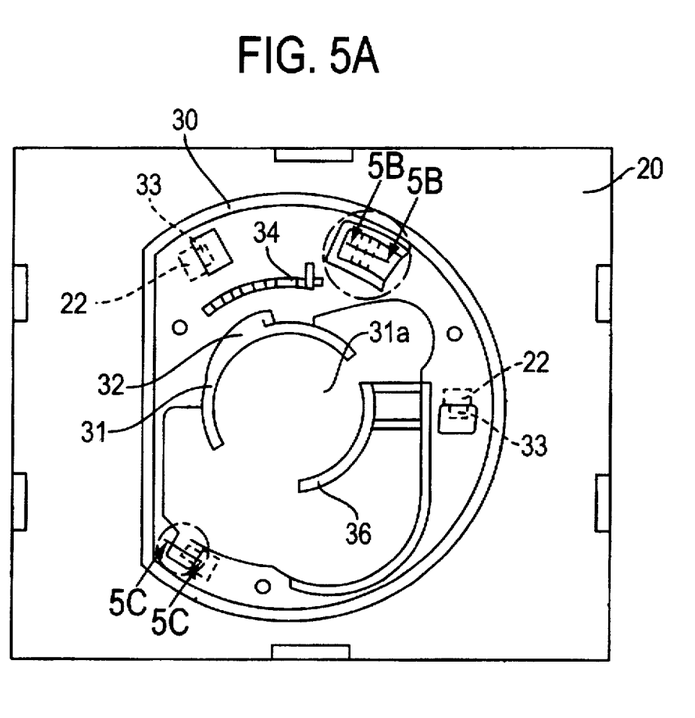
FIG. 5A is a front view of the neck retainer component structure of the present invention shown assembled to the shield case cover.
Figure 5B:
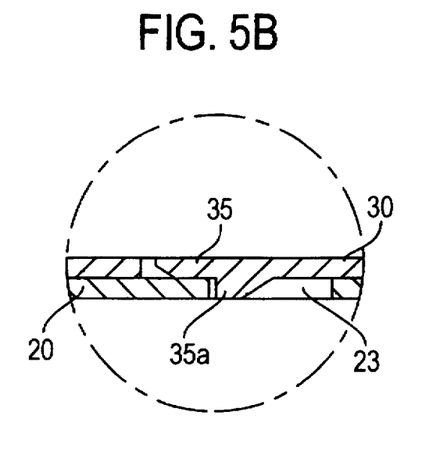
FIG. 5B is a cross section taken along line 5B—5B of FIG. 5A.
Figure 5C:
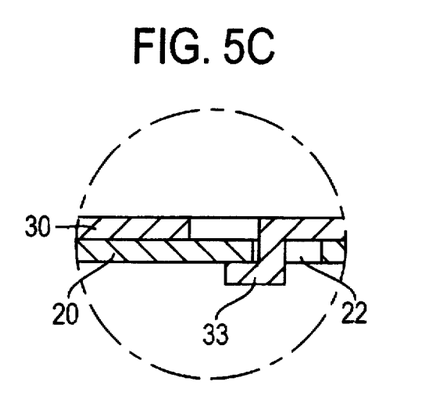
FIG. 5C is a cross section taken along line 5C—5C of FIG. 5A.

Insertion aperture 21 of shield case cover 20 and support aperture 31a defined by arcuate ribs 31 and 36 of retainer 30 are aligned, and assembly clips 33 of retainer 30 are fitted, from top to bottom, into corresponding ones of a plurality of assembly slots 22 formed on shield case cover 20 as seen in FIGS. 5A and 5C, and the retainer is rotated clockwise. By doing so, retainer 30 is secured on one side of shield case cover 20. Here, halting tab 35a of locating element 35 is inserted into locating aperture 23 of shield case cover 20, the engagement preventing retainer 30 from rotating reversely as seen in FIG. 5B.

In the preferred embodiment, the retainer is secured to the shield case cover using assembly slots 22 which receive assembly clips 33, and halting tab 35a engaged to locating aperture 23. However, retainer 30 may be fastened to the shield case cover by any known fastening method.

FIG. 6 shows locking band 40 coupled to retainer 30. To simplify illustration, only arcuate ribs 31 and 36 of retainer 30 and locking band 40 are depicted in FIGS. 6 and 7A.

When locking band 40 having locking aperture 40a is fitted around and onto arcuate ribs 31 and 36 of retainer 30, locking aperture 40a and support aperture 31a are aligned. In addition, curved notch 40b formed on one side of locking aperture 40a of locking band 40 receives control cam 32 which is integrally formed along the outer circumference of arcuate rib 31, and simultaneously, pawl 42 of arm 41 mounted on locking band 40 engages ratcheted member 34 of the retainer.

Once locking band 40 is fitted onto retainer 30 which has been fixed on shield case cover 20, neck 11 of cathode ray tube 10 is fed through support aperture 31a defined by arcuate ribs 31 and 36.

As shown in FIGS. 7A and 7B, in order to securely fasten neck 11 locking band 40 is rotated clockwise as indicated by arrow 43. This rotation causes curved notch 40b to bear against control cam 32 while moving away from control cam 32 which remains stationary, so that the inner diameter of support aperture 31a into which neck 11 is inserted decreases to fit the size of the neck's outer diameter, to thereby securely fix and support neck 11.

This tightening of arcuate ribs 31 and 36 around neck is incrementally accomplished by operation of a tightening means which comprises pawl 42 and ratchet 34. Retainer 30 is prevented from loosening due to the resilience force of arcuate ribs 31 and 36, and engagement of pawl 42 with ratchet 34. As a result, neck 11 is firmly fixed support aperture 31a of retainer 30.

Figure 8:
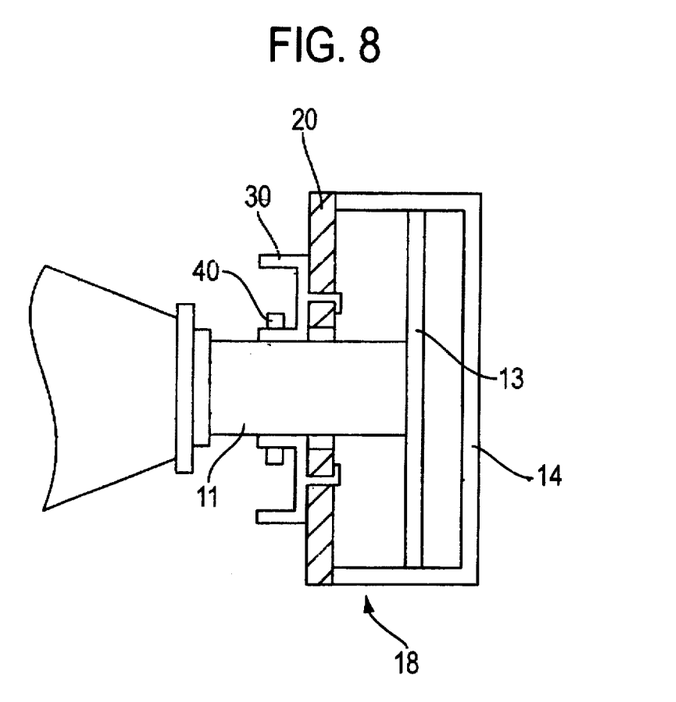
FIG. 8 is an assembled sectional view of the neck attachment structure of the present invention.

Referring to FIG. 8, it is noted that the attachment structure of the present invention allows the weight of circuit board 13 and shield case assembly 18 to be loaded on the center of neck 11 via retainer 30 and locking band 40.

As described above, the neck attachment structure of the present invention prevents the soldered connection of the neck and circuit board from cracking due to the weight of electronic components mounted on the circuit board, and thereby increase product reliability.

What is claimed is:

1. An attachment structure for affixing a circuit board to a cathode ray tube having a neck in which one end of the neck of the cathode ray tube is connected electrically and mechanically to a circuit pattern formed on the circuit board, said structure comprising:

a shield case assembly for housing the circuit board;

neck attachment means mounted on one side of said shield case assembly for securely attaching the neck to said shield case assembly so as to dispose the end of the neck in sufficient proximity to the circuit board housed therein to accomplish a connection; and tightening means operatively coupled to said neck attachment means so that said neck inserted thereinto is secured to said neck attachment means, wherein said neck attachment means comprises:

a retainer;

a plurality of assembly clips integral with said retainer, said assembly clips disposed to engage a plurality of corresponding assembly slots formed on one side of said shield case assembly;

a pair of arcuate ribs defining therebetween a support aperture integral with said retainer, said support aperture defining an inner diameter into which the neck is inserted; and a control cam integrally formed with said retainer to control the inner diameter of said support aperture.

2. The neck attachment structure as claimed in claim 1, wherein said shield case assembly comprises:

an insertion aperture on one side into which the neck is inserted;

a plurality of assembly slots disposed at predetermined locations substantially surrounding said insertion aperture; and a locating aperture to prevent dislocation of said fixing means with respect to said shield case assembly.

3. The neck attachment structure as claimed in claim 1, wherein said tightening means comprises:

a locking band formed with a locking aperture adapted to be aligned with said support aperture and fitted around said arcuate ribs of said retainer;

a curved notch integrally formed on an inner surface of said locking aperture for pressing said control cam of said retainer when said locking band is rotated to thereby tighten said support aperture around the neck.

4. The neck attachment structure as claimed in claim 3, wherein, said tightening means further comprises:

an arm integrally formed on said locking band, said arm having a pawl disposed toward said retainer.

a ratchet member protrudently formed on said retainer is adapted to engage said pawl of said arm to maintain any rotation position which said locking band assumes when rotated to press said control cam to thereby adjust said inner diameter of said support aperture to be the same as the outer diameter of the neck inserted therein.

5. The neck attachment structure as claimed in claim 1, wherein a locating element is provided on said retainer, said locating element having a halting tab integrally formed thereon and adapted to engage and resiliently lock onto a locating aperture on said shield case assembly to prevent said retainer from rotating reversely when said control cam is pressed against said locking aperture.

6. A cathode ray tube neck fixing structure for affixing the neck of a cathode ray tube to a printed pattern of a circuit board, said structure comprising:

a shield case assembly for housing the circuit board; and an attachment means for attaching the neck to said shield case assembly such that a soldered connection of the neck to the circuit board is spaced from the attachment of said shield case assembly, said attachment means comprising a retaining means and an incremental tightening means adapted to secure the neck to said shield case assembly, wherein said shield case assembly includes an insertion aperture on one side thereof, and wherein said retaining means comprises a retainer having a support aperture, said retainer adapted to be affixed to said shield case assembly such that said insertion aperture and said support aperture are aligned to receive and retain the neck of the cathode ray tube therein; and wherein said incremental tightening means comprises a locking band having a locking aperture, said locking band configured to be rotatably assembled to said retainer such that said locking aperture is aligned with said insertion aperture and said support aperture to receive and retain the neck of the cathode ray tube therein, and wherein rotation of said locking band with respect to said retainer results in a tightening of said structure around the neck.

7. The structure of claim 6, wherein said tightening means comprises a pair of arcuate ribs defining an inner diameter of said support aperture, one of said arcuate ribs including a control cam, and a notch on said locking aperture of said locking band adapted to mate with said control cam such that upon rotation of said locking band, said control cam presses against said locking aperture thereby reducing the inner diameter of said support aperture to tightly engage the neck of the cathode ray tube received therein.

8. A coupling device for coupling a neck of a cathode ray tube to a panel having an insertion aperture, said device comprising:

a retainer including
  a securing means for securing said retainer onto said panel, and
  a support aperture to be aligned with the insertion aperture of the panel to receive the neck, said support aperture having an inner diameter defined by an arcuate rib member having a control cam integrally formed on an outer surface thereof;

a locking ring having
  a locking aperture to be aligned with and surround said support aperture of said retainer,
  a notch integral with said locking aperture such that said control cam of said retainer is received within said notch and rotation of said locking ring causes said locking aperture to press against said control cam to thereby reduce said inner diameter of said support aperture and thereby engage the neck to securely couple the neck to the panel.

9. The coupling device of claim 8, wherein said retainer further comprises a ratchet member, and said locking ring further comprises an arm having a pawl adapted to engage said ratchet member such that rotation of said locking ring with respect to said retainer is favorable to one direction and is guided by said ratchet and said pawl.

* * * * *